April 21, 1953  H. G. ADLER  2,635,596
GOVERNOR STRUCTURE

Original Filed Feb. 6, 1946  3 Sheets-Sheet 1

INVENTOR.
HERMAN G. ADLER
BY Whittemore
Hulbert & Belknap
ATTORNEYS

April 21, 1953 H. G. ADLER 2,635,596
GOVERNOR STRUCTURE
Original Filed Feb. 6, 1946 3 Sheets-Sheet 2
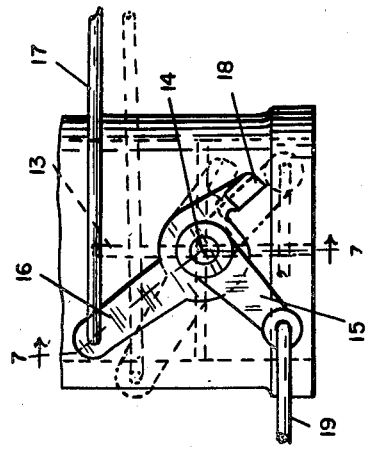
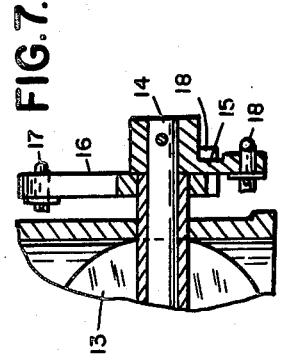
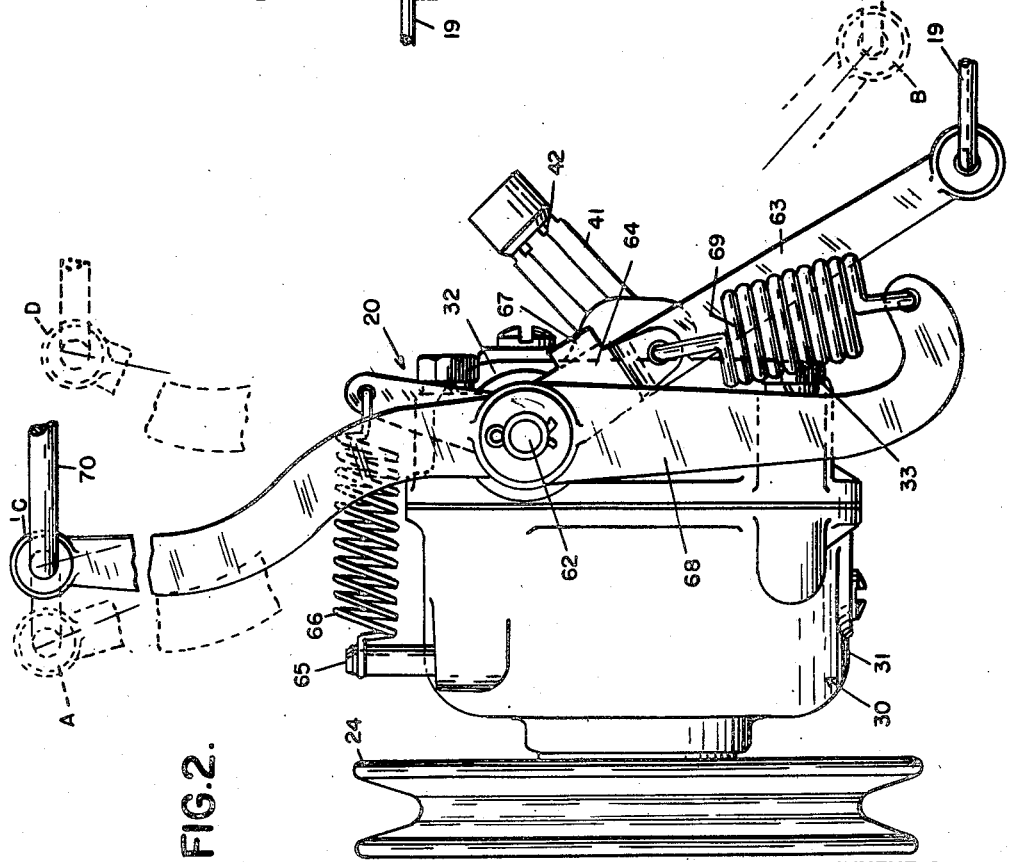
INVENTOR.
HERMAN G. ADLER
BY Whittemore,
Hulbert & Belknap
ATTORNEYS April 21, 1953   H. G. ADLER   2,635,596
GOVERNOR STRUCTURE
Original Filed Feb. 6, 1946   3 Sheets-Sheet 3
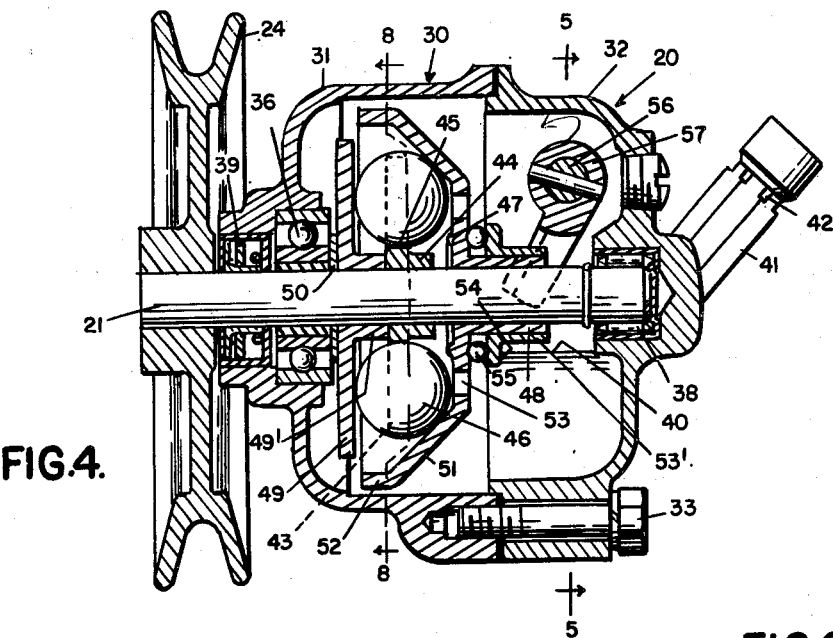
FIG.4.
FIG.5.   FIG.8.
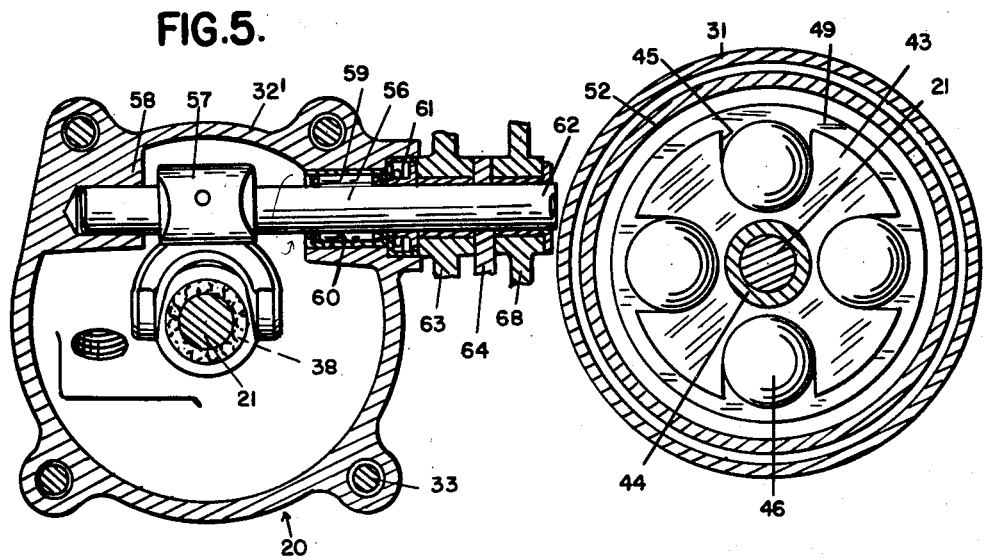
INVENTOR.
HERMAN G. ADLER
BY Whittemore
Hulbert & Belknap
ATTORNEYS Patented Apr. 21, 1953

2,635,596

UNITED STATES PATENT OFFICE 2,635,596

GOVERNOR STRUCTURE

Herman G. Adler, Detroit, Mich., assignor to Novi Equipment Company, Novi, Mich., a corporation of Michigan Original application February 6, 1946, Serial No. 645,908, now Patent No. 2,598,960, dated June 3, 1952. Divided and this application December 23, 1948, Serial No. 66,987

3 Claims. (Cl. 123—99)

This invention relates generally to speed regulating governors and refers more particularly to improvements in centrifugal governors and is a division of my prior copending application, Serial No. 645,908, filed February 6, 1946, now Patent No. 2,598,960, issued June 3, 1952.

One of the objects of this invention is to provide a governor capable of performing efficiently to control the speed of various different types of power plants, but is especially adapted for installation on so-called all purpose power plants having some uses requiring governor operation and having other uses where it is desired to manually regulate the speed independently of the governor.

Another object of this invention is to provide a governor assembly connected to the speed control mechanism of a variable speed power plant in a manner to enable selectively obtaining manual or automatic operation of the control mechanism without interfering with the driving connection between the governor and power plant or without altering the governor connection with the speed control mechanism.

Still another object of this invention is to provide manually operable means conveniently located for manipulation by the operator for rendering the governor inoperative and for also adjusting the governor to vary the governing speed range between predetermined minimum and maximum speeds.

A further object of this invention is to provide a centrifugal governor having weighted members movable radially outwardly in response to the speed of the power plant and having means responsive to rotation of the governor drive shaft at a speed in excess of the maximum governing range to reduce the axial force component applied by the weighted members to a minimum.

A still further object of this invention is to provide a centrifugal governor of the above general type composed of a relatively few simple parts capable of being readily manufactured, assembled and installed.

The foregoing as well as other objects will be made more apparent as this description proceeds, especially when considered in connection with the accompanying drawings, wherein:

Figure 2 is a side elevational view of the governor;

Figure 4 is a sectional view taken on the line 4—4 of Figure 5;

Figure 5 is a cross sectional view taken on the line 5—5 of Figure 4;

Figure 6 is an elevational view of the throttle valve assembly for the power plant;

Figure 7 is a sectional view taken on the line 7—7 of Figure 6; and

Figure 8 is a sectional view taken on the line 8—8 of Figure 4.

Figure 1:
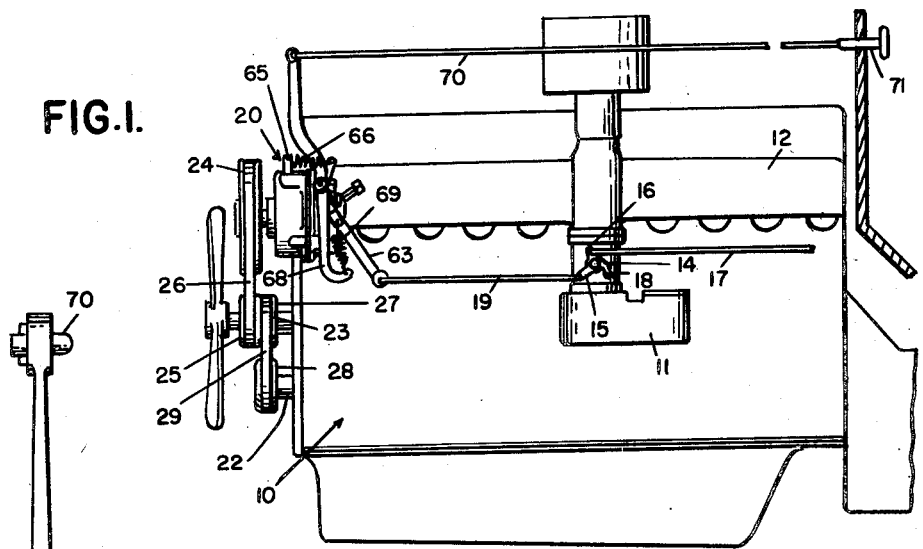
Figure 1 is a diagrammatic elevational view of a power plant equipped with a governor constructed in accordance with this invention.
Figure 3:
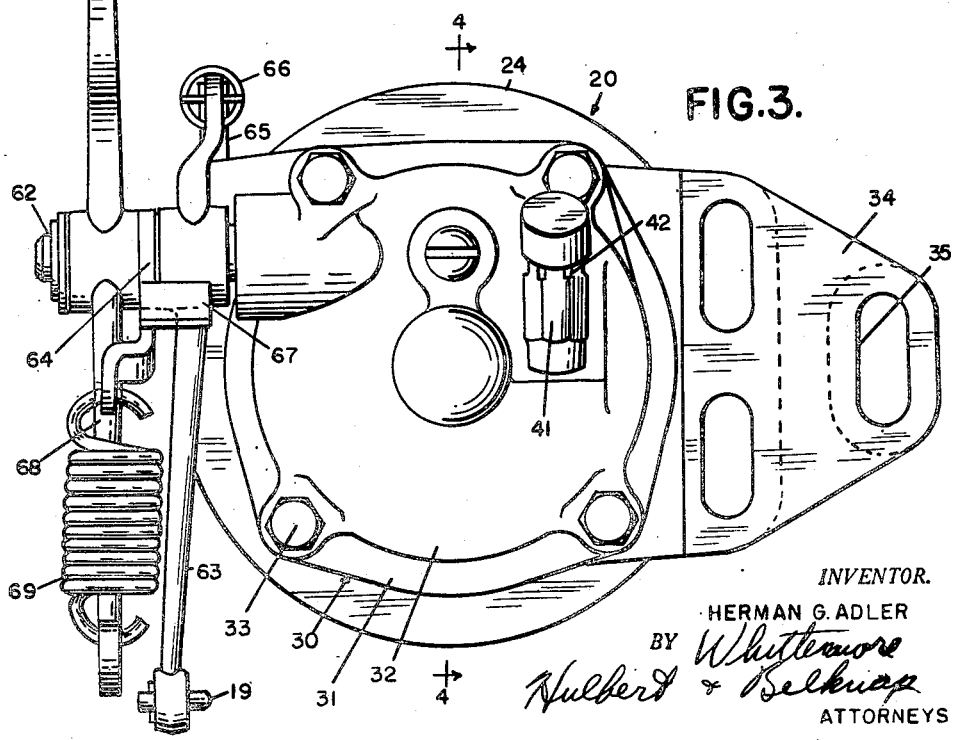
Figure 3 is an end elevational view of the governor.

The centrifugal governor selected for the purpose of illustrating this invention is particularly adapted for installation on vehicle power plants having an internal combustion engine diagrammatically shown in Figure 1 of the drawings and indicated generally by the reference character 10. The internal combustion engine 10 is of orthodox design having a fuel induction system including a carburetor 11 and appropriate manifolding 12. The carburetor 11 is of conventional construction having a throttle valve 13 secured to a rotatable shaft 14 having an arm 15 secured thereto and having a lever 16 rotatably supported thereon adjacent the arm 15. One end of the lever 16 is connected to a throttle control element (not shown) by a link 17 and the other end of the lever has a projection 18 for operating the throttle valve through the arm 15. In the case of a vehicle, a throttle control element will of course normally be a conventional accelerator pedal which is broadly described herein as manually operable. The free end of the arm 15 is connected to a link 19 and the latter is operatively connected to the governor in a manner to be more fully described. Thus, the throttle may be operated in the usual manner by manipulating the control link 17 or may be operated independently of the link 17 and lever 16 by operating the arm 15 through the governor controlled link 19.

The governor is indicated in the several figures of the drawings by the reference character 20 and comprises a rotatable shaft 21 driven from the crank shaft 22 of the engine through the fan driving shaft 23. In the present instance a pulley 24 is fixed to the shaft 21 and is connected to a pulley 25 on the fan driving shaft 23 by a belt 26. A second pulley 27 on the fan driving shaft 23 is connected to a pulley 28 on the crank shaft 22 by a belt 29.

The shaft 21 is journaled in a housing 30 formed of two parts 31 and 32 removably secured together by studs 33. The housing 30 is attachable to the engine by a bracket 34 formed on the front section 31 of the housing and having slots 35 for receiving studs or other suitable fastener elements. The slots 35 are elongated in a vertical direction to enable adjusting the length of the belt 26 by varying the elevation of the governor relative to the engine 10. The shaft 21 is supported in the front section 31 of the housing by a ball bearing 36 and is supported in the rear housing section 32 by a needle bearing 38. A suitable seal 39 is disposed in the front section of the housing between the bearing 36 and front end of the housing 30 to prevent the escape of lubricant from the housing. In this connection, it is pointed out that in use the housing 30 is filled with lubricant up to the level indicator in Figure 4 of the drawings by the reference character 40 and this lubricant is inserted into the housing through a filler opening normally closed by a plug 41. The plug 41 is formed with vents 42 adjacent the outer end so that the interior of the housing 30 is maintained at atmospheric pressure. As a result, overheating of the lubricant is avoided and practically no positive pressure is applied to the seal 39.

A driving disc 43 is supported on the shaft 21 within the housing 30 and is formed with a central hub 44 welded or otherwise fixed to the shaft 21 for rotation as a unit with the latter. As shown in Figure 8 of the drawings the disc 43 is formed with a plurality of slots 45 spaced equal distances from each other circumferentially of the disc and extending radially from the hub 44 to the periphery of the disc. A ball 46 is positioned in each slot 45 and the diameter of the balls is sufficiently less than the width of the slots to enable free movement of the balls relative to the disc. The balls 46 are enclosed in a cup-shaped member 47 also supported in the housing 30 and having a centrally arranged hub 48 slidably supported on the shaft 21 at the rear side of the driving disc 43. A ball retaining disc 49 is located in the housing 30 at the front side of the balls 46 and is formed with a rearwardly extending central hub 49' rotatably mounted on the shaft 21. The rear end of the hub 49' abuts the fixed driving disc 43 and a thrust washer 50 is supported on the shaft 21 between the bearing 36 and disc 49. As a result the disc 49 is held from shifting movement axially of the shaft 21 and displacement of the balls 46 from the slots 45 in the driving disc 43 is prevented.

The cup-shaped member 47 has a frusto-conical portion 51 and is formed with an annular flange 52 at the periphery of the portion 51. The annular flange 52 extends forwardly toward the retaining disc 49 and is concentric to the axis of the shaft 21. Suitable openings 53 are formed in the base of the cup-shaped member to enable free flow of lubricant through the cup-shaped member with the result that no appreciable resistance is offered to reciprocation of the member 47 on the shaft 21.

The cup-shaped member 47 is normally urged to the position shown in Figure 4 of the drawings by spring means to be more fully hereinafter described. When in this normal position, the balls 46 are engaged by the frusto-conical portion 51 of the member 47 and are held in their radially innermost positions in the slots 45. However, as the speed of rotation of the shaft 21 exceeds a predetermined minimum rate, the balls 46 move radially outwardly in their respective slots by centrifugal force. Inasmuch as the balls are retained in contact with the frusto-conical portion 51 of the member 47 by the disc 49, the member 47 is shifted rearwardly along the shaft 21 until the balls engage the annular flange 52 on the member 47. When this condition exists all of the centrifugal force in excess of that required to move the balls outwardly into contact with annular flange 52 is taken up by flange 52, and very little, if any, of this force is transmitted in the form of an axial thrust on either the disc 49 or member 47. Thus, the thrust bearings and associated parts are relieved of stresses or strains when the shaft 21 is rotated in excess of the speed controlled by the governor.

Movement of the member 47 axially of the shaft 21 effects a corresponding movement of a thrust collar 53' rotatably supported on the hub 48 and having a radially outwardly extending flange 54 at the front end cooperating with the adjacent surface of the member 47 to retain a series of balls 55 therebetween. The thrust collar operates a rock shaft 56 by a fork 57 secured to the rock shaft with the free ends of the arms straddling the collar and engaging the radial flange 54. As shown in Figure 5 of the drawings, one end of the rock shaft 56 is journaled in a bore formed in an enlargement 58 on the housing section 32 and the opposite end of the rock shaft is journaled in a needle bearing 59 supported in an aligned bore 60 extending through the wall of the housing section 32 opposite the enlargement. The outer end of the bore 60 is counterbored to house a lubricant seal 61 and the adjacent end 62 of the rock shaft extends outwardly beyond the housing.

A bell crank lever 63 is freely rotatably mounted on the end 62 of the rock shaft 56 and a rock arm 64 is secured to the end 62 beyond the bell crank lever 63. The lower end of the lever 63 is pivotally connected to the throttle valve operating link 19 and the upper end of the lever is connected to a fixed post 65 by a coil spring 66. The post 65 is fixed to the housing forwardly of the bell crank lever 63 so that the spring 66 normally swings the lever 63 in a counterclockwise direction, as viewed in Figure 2 of the drawings, to position the lower end portion of the lever 63 against a stop 67 projecting laterally from the rock arm 64. The lower end of the arm 64 is connected to the lower end of a second bell crank lever 68 by means of a relatively strong spring 69. The lever 68 is freely rotatably supported intermediate the ends thereof on the rock shaft 56 and the upper end is pivotally connected to a control link 70. The control link 70 extends to a position where it may be conveniently manipulated by the operator and is provided with a manually operable control 71 for this purpose.

When the upper end of the lever 68 is positioned at A by the operator, the tension and effective arm on the spring 69 is relieved and practically no resistance is offered to movement of balls 46 to their outermost positions by the action of centrifugal force. Thus, the member 47 with the thrust collar 53 thereon is readily shifted rearwardly along the shaft 21 and the rock arm 64 is rotated in an anticlockwise direction to its idle position. The relatively weak spring 66 effects a corresponding movement of the bell crank lever 63 and positions the latter against stop 67 on the rock arm to locate the lower end of the lever 63 at the idle position B.

As stated above, the lower end of the bell crank lever 63 is connected to the throttle valve 13 by the link 19 so that movement of this lever to the position B rotates the throttle valve 13 to its closed or idle position. When the throttle valve 13 is in its idle position, the arm 15 is engaged by the end 18 of the lever 16 so that operation of the latter by the manually operable control link 17 imparts a rocking movement to the arm 15 in a direction to open the throttle. Inasmuch as the arm 15 is rigidly connected to the lower end of the lever 63 by the link 19, it follows that rocking movement of the arm 15 by the control link 17 to open the throttle valve 13 also rotates the bell crank lever 63 in a clockwise direction about the rock shaft 56. Rotation of the bell crank lever 63 in a clockwise direction is effected without disturbing the governor rock arm 64 because the lever 63 merely moves away from the stop 67 and is opposed only by the spring 66. However, as soon as the operator releases the manually operable control link 17, the spring 66 swings the bell crank lever back against the stop 67 on the governor rock arm 64 and returns the throttle valve to its closed or idle position. Thus, the throttle valve 13 may be operated to regulate the speed of the engine 10 independently of the governor.

When it is desired to regulate the speed of of the engine by the governor, the operator merely manipulates the control 71 to locate the upper end of the bell crank lever 68 in any desired position between C and D. The character C indicates a position where the governing speed is at a minimum and the character D designates a position where the governing speed is at a maximum. Actually, movement of the upper end of the bell crank lever 68 from the position C to the position D progressively increases the tension and arm of the spring 69 and correspondingly increases the force opposing rocking movement of the arm 64 in a counterclockwise direction by the governor action.

The spring 69 is, of course, considerably stronger than the throttle valve return spring 66 so that movement of the bell crank lever 68 to any one of its operative positions between C and D rocks the arm 64 in a clockwise direction and imparts a corresponding rocking movement to the bell crank lever 63 to open the throttle valve 13. The extent of opening of the throttle valve 13 depends upon the angular movement imparted to the lever 63 and this movement, in turn, is controlled by the manually operable lever 68. It will, of course, be noted that as the rock arm 64 is rotated in a clockwise direction, the member 47 is shifted forwardly on the shaft 21 against the centrifugal force exerted by the balls 46 and the spring 69 is thereby tensioned to an extent depending on the setting of the lever 68. However, as the centrifugal force exceeds the opposing force applied to the rock arm 64 by the spring 69, the rock arm is moved in a counterclockwise direction by the member 47 and, since the lever 63 is compelled to follow the rock arm 64, the throttle valve 13 is moved toward its closed or idle position to decrease the speed of the engine. When the engine speed decreases to such an extent to cause a drop in the centrifugal force below the force exerted by the spring 69, the rock arm 64 and associated lever 63 is again moved in a clockwise direction to open the throttle. Thus, the engine speed is controlled by the governor and depends to a large extent on the tension and effectiveness of the spring 69. Although the throttle operating bell crank lever 63 operates in conjunction with the arm 64 during governor control, nevertheless, it will be noted that the lever 63 is always free to swing in a clockwise or throttle opening direction relative to the rock arm 64. At any time, therefore, governor control of the engine speed may be dispensed with by merely manipulating the control 71 to locate the lever 68 at the idle position A and thereafter regulating the throttle through the usual manually operable control in the orthodox manner.

As a result of the novel construction engine speed may be controlled manually (as by an accelerator pedal) or by the governor. Thus the device is particularly useful in conjunction with prime movers and a powerful takeoff. By way of specific example the invention may be applied to a road vehicle which may also be used as a light tractor and as a power plant. When used as a road vehicle, at which time relatively high engine speeds may be obtained, the governor spring is set to substantially zero effectiveness so that at very low speed the balls 46 move outwardly into contact with the cylindrical flange 52. Thereafter increase in centrifugal force developed by the relatively high speeds of the engine are completely absorbed by the flange 52 thus avoiding heavy thrust on the bearings and accordingly, substantially reducing wear on the governor parts. It is pointed out that in this case engine speed under manual control may be substantially higher than maximum governed speed. Since centrifugal force varies as the square of angular velocity, the provision of the annular flange to absorb centrifugal forces developed by the balls is a very important feature.

The drawings and the foregoing specification constitute a description of the improved governor structure in such full, clear, concise and exact terms as to enable any person skilled in the art to practice the invention, the scope of which is indicated by the appended claims.

What I claim as my invention is:

1. In combination, an internal combustion engine having a throttle, resilient means biasing said throttle toward closed position, manual means normally in throttle closed position having one-way connections with said throttle to move said throttle toward open position, centrifugal governor means comprising a shaft, a pair of plates relatively axially movable on said shaft and converging radially outwardly of said shaft, a plurality of balls rotatable with said shaft between said plates, an adjustable governor spring opposing separation of said plates, a cylindrical flange on one of said plates limiting outward movement of said balls, means having a one-way connection with said throttle for moving said throttle toward open position in response to relative movement of said plates toward each other, whereby movement of said throttle toward open position by either of said manual means or said governor means does not move the other of said means, said governor spring being adjustable to substantially zero effectiveness to permit outward movement of said balls against said flange at low speed and to provide for high speed operation under manual control in which substantially all of the high centrifugal forces developed are absorbed by said flange.

2. In combination, an internal combustion engine having a pivoted throttle, a first lever rigidly connected to said throttle for moving it between open and closed positions, manual means for operating said throttle comprising a second lever pivoted concentrically with said first lever and means on said first and second levers engageable when said second lever is moved in throttle opening direction, a centrifugal governor comprising a shaft driven in accordance with engine speed, a pair of plates relatively axially movable on said shaft and converging radially outwardly of said shaft, a plurality of balls rotatable with said shaft between said plates, a cylindrical flange on one of said plates limiting outward movement of said balls, a third lever carried by said governor, means for rocking said third lever in response to relative movement between said plates axially of said shaft, a fourth lever pivoted concentrically with said third lever, abutment means on said third and fourth levers engageable when said third lever moves in the direction resulting from inward movement of said balls and corresponding relative movement of said plates toward each other upon reduction in engine speed, spring means connected to said fourth lever and effective to urge said fourth lever in a direction to bring the abutment means on said third and fourth levers into engagement, adjustable spring means opposing separation of said plates, means for adjusting said adjustable spring means to substantially zero effectiveness to permit outward movement of said balls against said flange at low speed and to provide for high speed operation under manual control in which substantially all of the high centrifugal forces developed are absorbed by said flange, a link connecting said fourth and first levers, said first mentioned spring means being effective through said link to urge said first lever in throttle closing direction.

3. Structure as defined in claim 2 in which said adjustable spring means comprises a manually adjustable fifth lever mounted concentrically with said third and fourth levers and a spring connecting said fifth and third levers, said fifth lever being adjustable to bring the line of action of said last mentioned spring into proximity with the pivot axes of said third, fourth and fifth levers to bring about the substantially zero effectiveness of said last mentioned spring.

HERMAN G. ADLER.

References Cited in the file of this patent
UNITED STATES PATENTS

| Number | Name | Date |
|---|---|---|
| 1,105,408 | Dechamps | July 28, 1914 |
| 1,135,054 | Schacht | Apr. 13, 1915 |
| 1,689,893 | Royce | Oct. 20, 1928 |
| 2,224,600 | Howard | Dec. 10, 1940 |
| 2,443,084 | Rhodes | June 8, 1948 |